(12) United States Patent
    Terada

(10) Patent No.: US 11,002,588 B2
(45) Date of Patent: May 11, 2021

(54) LIQUID SURFACE DETECTING DEVICE AND METHOD OF MANUFACTURING SAME

(71) Applicant: DENSO CORPORATION, Kariya (JP)

(72) Inventor: Yoshifumi Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 198 days.

(21) Appl. No.: 16/398,356

(22) Filed: Apr. 30, 2019

(65) Prior Publication Data
    US 2019/0257684 A1    Aug. 22, 2019

Related U.S. Application Data

(63) Continuation of application No. PCT/JP2017/039646, filed on Nov. 2, 2017.

(30) Foreign Application Priority Data

Nov. 4, 2016  (JP) .............................. JP2016-216541

(51) Int. Cl.
    *G01F 23/36*    (2006.01)
    *G01F 23/30*    (2006.01)
    *G01F 23/32*    (2006.01)
    *G01F 23/00*    (2006.01)

(52) U.S. Cl.
    CPC ............. *G01F 23/36* (2013.01); *G01F 23/00* (2013.01); *G01F 23/30* (2013.01); *G01F 23/32* (2013.01)

(58) Field of Classification Search
    CPC .......... G01F 23/36; G01F 23/30; G01F 23/32; G01F 23/00; G01F 23/363
    See application file for complete search history.

(56) References Cited

U.S. PATENT DOCUMENTS

2016/0363474 A1* 12/2016 Terada .................. G01F 23/363

FOREIGN PATENT DOCUMENTS

| JP | 2005345113 A | 12/2005 |
| JP | 2006017519 A | 1/2006 |
| JP | 5376980 B2 | 12/2013 |

* cited by examiner

*Primary Examiner* — Benjamin R Schmitt
(74) *Attorney, Agent, or Firm* — Harness, Dickey & Pierce, P.L.C.

(57) ABSTRACT

A liquid surface detecting device includes a movable body, a circuit board, segment electrodes, an output electrode, and a resistive element located across the segment electrodes and the output electrode to be electrically connected thereto. The segment electrodes are arranged on the mounting surface in an electrode region. The resistive element includes first and second resistive portions on both sides of the electrode region in the movement direction. The resistive element is electrically connected to the output electrode at each of the first and second resistive portions. The movement direction in which the movable body moves according to a decrease of the liquid surface level is defined as a reference direction. The second resistive portion located further in the reference direction than the first resistive portion is completely cut off to block a conduction between its output electrode side and electrode region side.

7 Claims, 11 Drawing Sheets

LIQUID SURFACE DETECTING DEVICE AND METHOD OF MANUFACTURING SAME

CROSS REFERENCE TO RELATED APPLICATIONS

The present application is a continuation application of International Patent Application No. PCT/JP2017/039646 filed on Nov. 2, 2017, which designated the United States and claims the benefit of priority from Japanese Patent Application No. 2016-216541 filed on Nov. 4, 2016. The entire disclosures of all of the above applications are incorporated herein by reference.

TECHNICAL FIELD

The present disclosure relates to a liquid surface detecting device for detecting a liquid surface level of a fuel in a fuel tank, and a method of manufacturing the device.

BACKGROUND

In a widely known liquid surface detecting device, a plurality of segment electrodes aligned in a movement direction of a movable body reciprocating following a liquid surface level are provided on a mounting surface of a circuit board.

SUMMARY

A liquid surface detecting device in a first aspect of the present disclosure is for detecting a liquid surface level of fuel in a fuel tank. The liquid surface detecting device includes a movable body that includes a sliding contact and is configured to reciprocates in accordance with the liquid surface level, a circuit board that includes a mounting surface and is fixed in position to the fuel tank, a plurality of segment electrodes that are provided on the mounting surface to be arranged in a movement direction of the movable body, the sliding contact being configured to come in sliding contact with the plurality of segment electrodes in accordance with a movement of the movable body, an output electrode that is provided on the mounting surface and configured to give an electric output in accordance with an electrical resistance between the output electrode and the sliding contact, and a resistive element that is provided on the mounting surface and has a higher electrical resistance than those of the plurality of segment electrodes. The resistive element is located across the plurality of segment electrodes and the output electrode to be electrically connected to the plurality of segment electrodes and the output electrode. The plurality of segment electrodes are arranged on the mounting surface in an electrode region. The resistive element includes a first resistive portion and a second resistive portion on both sides of the electrode region in the movement direction. The resistive element is electrically connected to the output electrode at each of the first resistive portion and the second resistive portion. The movement direction in which the movable body moves in accordance with a decrease of the liquid surface level is defined as a reference direction. The second resistive portion located further in the reference direction than the first resistive portion is completely cut off to block a conduction between its output electrode side and electrode region side.

In a second aspect of the present disclosure, according to a method of manufacturing the liquid surface detecting device, a formation process is performed, in which the resistive element having resistive portions respectively on both sides of the electrode region in the movement direction is formed on the mounting surface. In addition, a cutting process is performed, in which one of the resistive portions serving as the second resistive portion located further in the reference direction than the first resistive portion is completely cut off.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
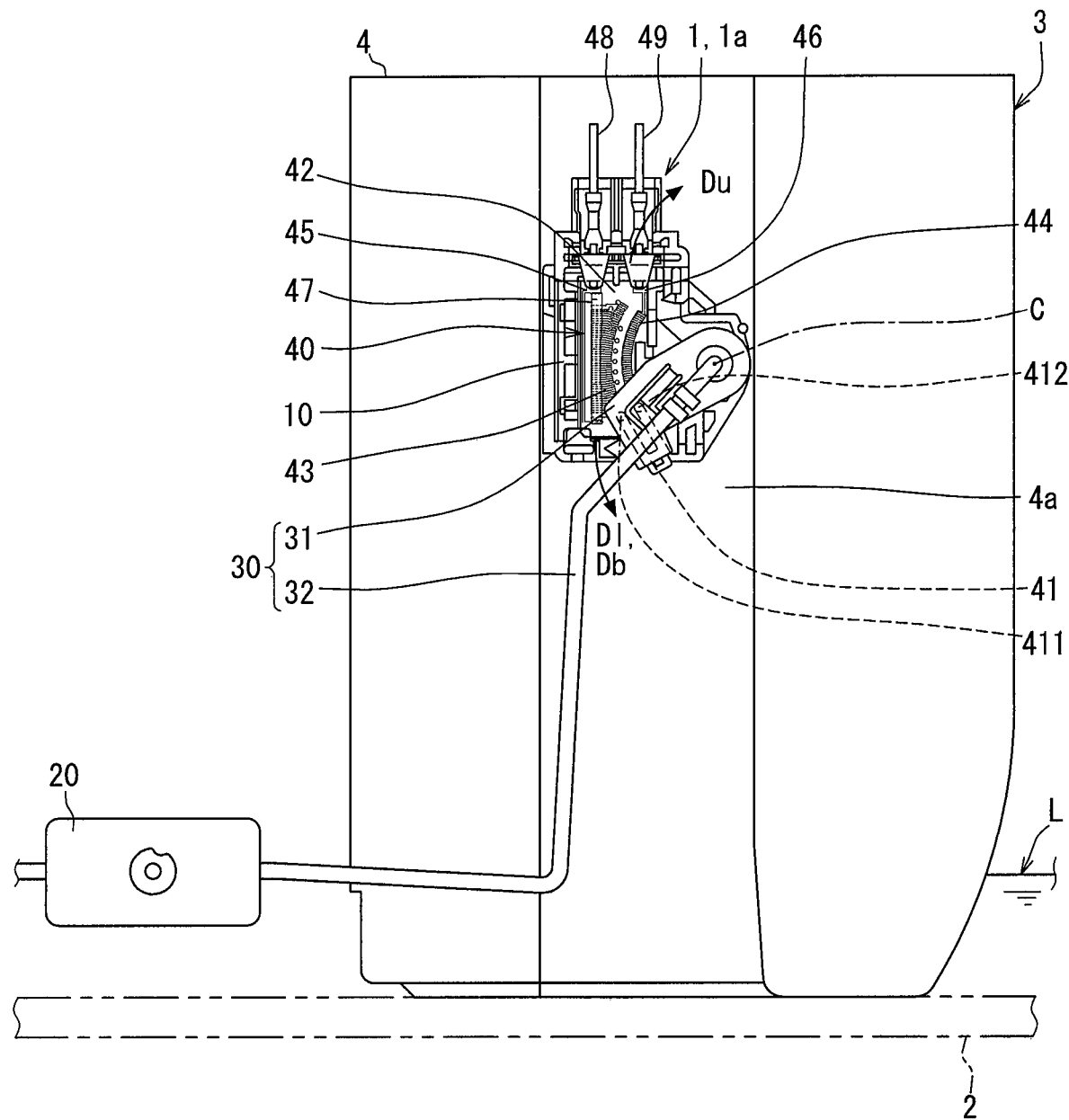
FIG. 1 is a front structural view showing a liquid surface detecting device in a non-inverting configuration according to an embodiment.

In an exemplary device as a liquid surface detecting device of this type, a resistive element and an output electrode are provided on a mounting surface of the circuit board. In this example, the resistive element has a higher electrical resistance than that of the segment electrodes, and is electrically connected across the segment electrodes and the output electrode. As a result, an electric output supplied from the output electrode represents a liquid surface level in accordance with an electrical resistance between the output electrode and a sliding contact which slides in contact with the segment electrodes attributable to the movement of the movable body.

In this exemplary liquid surface detecting device, a plurality of connection portions made of the same material as that of a fixed electrode and the output electrode and electrically connected thereto are provided between the output electrode and the fixed electrode providing the multiple segment electrodes. Those connection portions are completely disconnected except for at least one connection portion, so that a conduction between the fixed electrode side and the output electrode side is cut off at a complete cut portion. The completely disconnected connection portion is changed to another connection portion when an alignment direction of the segment electrodes in which the electrical resistance between the sliding contact and the output electrode gradually increases is reversed. Therefore, if the connection portion to be completely cut is changed, a configuration before the complete cutoff can be made common between a non-inverting configuration and an inverting configuration.

However, in this exemplary liquid surface detecting device, a relationship between the alignment direction of the segment electrodes in which the electrical resistance between the sliding contact and the output electrode gradually increases and the movement direction of the movable body is not clarified. For that reason, in the case where the alignment direction in which the electrical resistance gradually increases is opposite to the movement direction in which the movable body moves in accordance with a reduction in the liquid surface level, it is conceivable that an issue arises because the electrical resistance of each segment electrode between the sliding contact and the output electrode increases with time due to a deterioration of the resistive element material and the electrode material. The issue relies on the fact that the electric output from the output electrode decreases in response to the increased electrical resistance for each segment electrode over time despite a decrease in the liquid surface level. In that case, since the liquid surface level higher than an actual level is erroneously detected, a detection result of the remaining fuel level may be given regardless of the fuel running out in a fuel tank.

Further, in the above exemplary liquid surface detecting device, before the complete disconnection at the connection portion, the segment electrodes are electrically connected not only by the resistive element but also by a part of the fixed electrode. As a result, in order to realize the configuration commonality before the complete cutting in the non-inverting configuration and the inverting configuration, it is conceivable that there is a need to provide a complete cut portion at the fixed electrode between the segment electrodes together with the connection portion, with the result that the productivity may be lowered.

Hereinafter, an embodiment will be described with reference to the drawings.

Figure 2:
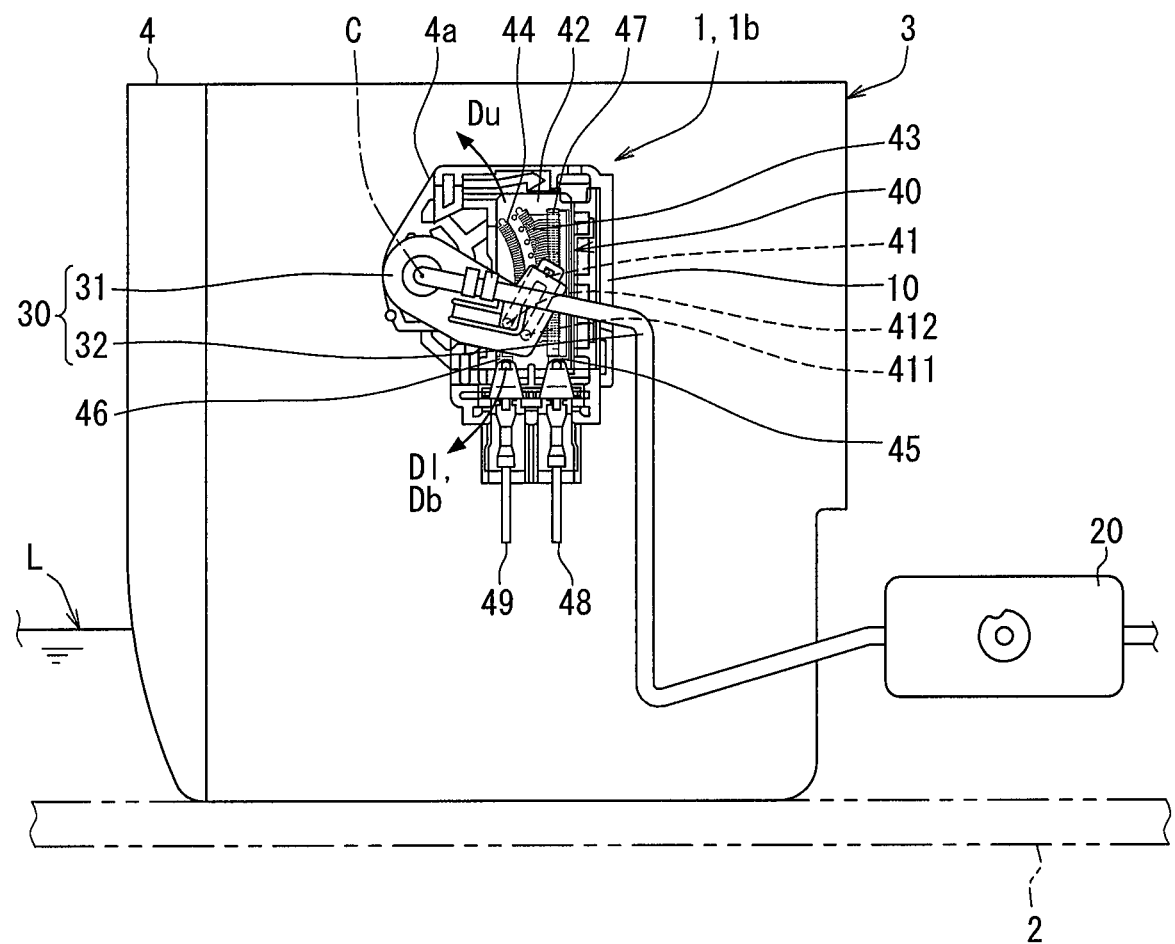
FIG. 2 is a front structural view showing a liquid surface detecting device in an inverting configuration according to the embodiment.

As shown in FIGS. 1 and 2, a liquid surface detecting device 1 according to an embodiment is installed in a fuel tank 2 as a "container" mounted on a vehicle. The fuel tank 2 stores a fuel as a "liquid" to be supplied to an internal combustion engine of the vehicle inside. Therefore, the liquid surface detecting device 1 detects a liquid surface level L of the fuel while being held by a sub-tank 4 of a fuel pump module 3 at a position immersed in the fuel in the fuel tank 2. In this example, the sub-tank 4 is installed in the fuel tank 2 to constantly store the fuel with which the fuel pump module 3 is replenished inside, so that the fuel pump module 3 can be continuously replenished with the fuel to be supplied to the internal combustion engine. Therefore, the liquid surface detecting device 1 can detect the liquid surface level L of the fuel in the fuel tank 2 by being attached to an outer peripheral wall 4a of the sub-tank 4. In the following description, it is assumed that upper and lower portions of the vehicle on a horizontal plane are upper and lower portions of the liquid surface detecting device 1.

In the liquid surface detecting device 1 as a placement form in the fuel tank 2, two types of forms of attachment to the sub-tank 4 are prepared as shown in FIGS. 1 and 2. In either of the forms shown in FIGS. 1 and 2, the liquid surface detecting device 1 includes a body 10, a float 20, a movable body 30, and a variable resistance unit 40. Here, in the configuration of FIG. 2, the orientations of the body 10 and the variable resistance unit 40 are inverted vertically from the configuration of FIG. 1. Therefore, in the following description, a configuration for realizing the form of FIG. 1 will be described as a non-inverting configuration 1a, and a configuration for realizing the mode of FIG. 2 will be described as an inverting configuration 1b.

First, a description will be given of a common portion between the non-inverting configuration 1a and the inverting configuration 1b. As shown in FIGS. 1 and 2, the body 10 is made of a fuel-resistant resin material such as polyacetal resin. The body 10 has a plate-shape that is long in a vertical direction as an overall. The body 10 is held by the outer peripheral wall 4a of the sub-tank 4 so that the body 10 is positionally fixed to the fuel tank 2 through the fuel pump module 3.

The float 20 is made of a lightweight rubber material such as foamed ebonite, for example. The float 20 exhibits a block shape given a specific gravity smaller than that of the fuel. The float 20 floats on the fuel level in the fuel tank 2 and moves up and down to a position corresponding to the liquid surface level L.

The movable body 30 includes a rotor 31 and an arm 32. The rotor 31 is made of a fuel-resistant resin material such as polyacetal resin, for example. The rotor 31 has a plate-shape rotatable about a rotation center line C substantially perpendicular to the vertical direction. The rotor 31 is rotatable about the rotation center line C by being supported by the body 10.

The arm 32 is made of, for example, a hard metal material such as stainless steel. The arm 32 has a bent rod shape that bends at multiple points corresponding to the shape of the fuel tank 2. The arm 32 is connected between the float 20 and the rotor 31. As a result, the rotor 31 together with the arm 32 can be rotated forward and backward around the rotation center line C so as to follow the vertical movement of the float 20. In other words, the movable body 30 including the arm 32 and the rotor 31 can realize reciprocating movement following the liquid surface level L in movement directions Dl and Du which are forward and backward rotational directions around the rotation center line C.

In this example, one movement direction Dl is set in a downward direction as the liquid surface level L is lowered, and the other movement direction Du is set in an upward direction as the liquid surface level L is raised. At both side moving ends in the movement directions Dl and Du, an end portion of the arm 32 opposite to the float 20 is locked by the body 10. As a result, a reciprocable range of the movable body 30 including the arm 32 is limited to a predetermined limit angle range. Particularly, in the present embodiment, the movement direction Dl in which the movable body 30 moves in response to a decrease in the liquid surface level L is defined as a reference direction Db.

As shown in FIGS. 1 to 4, the variable resistance unit 40 includes terminals 48 and 49, a movable electrode 41, a circuit board 42, fixed electrodes 43 and 44, output electrodes 45 and 46, and a resistive element 47.

The first and second terminals 48 and 49 shown in FIGS. 1 and 2 are formed of a conductive metal material such as phosphor bronze. The first and second terminals 48 and 49 are electrically connected to the first and second output electrodes 45 and 46, respectively. The terminals 48 and 49 are electrically connected to an external circuit outside the fuel tank 2 in the vehicle, to thereby supply electric outputs from the first and second output electrodes 45 and 46 to the external circuit. As a result, the external circuit can acquire a value of the liquid surface level L detected on the basis of the electric outputs from the first and second output electrodes 45 and 46.

The movable electrode 41 is made of, for example, a conductive metal material such as a copper alloy. The movable electrode 41 has a plate-shape, for example, a substantially U-shape or the like, which is given elastically deformable flexibility at both end portions. An intermediate portion between both the end portions of the movable electrode 41 is held rotatably integrally on a side of the rotor 31 facing the body 10.

Figure 3:
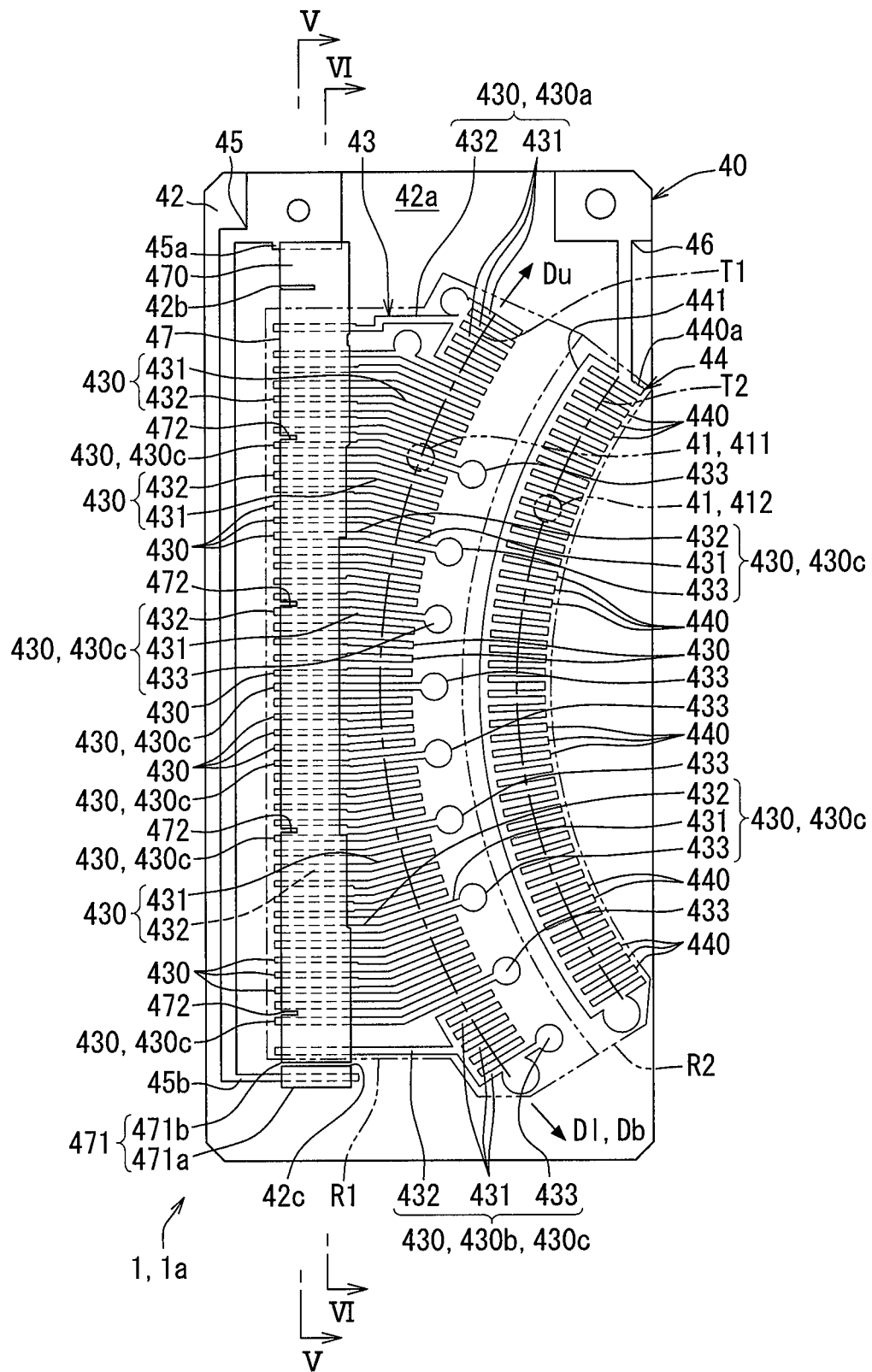
FIG. 3 is a front structural view showing a variable resistance unit in a non-inverting configuration according to the embodiment.
Figure 4:
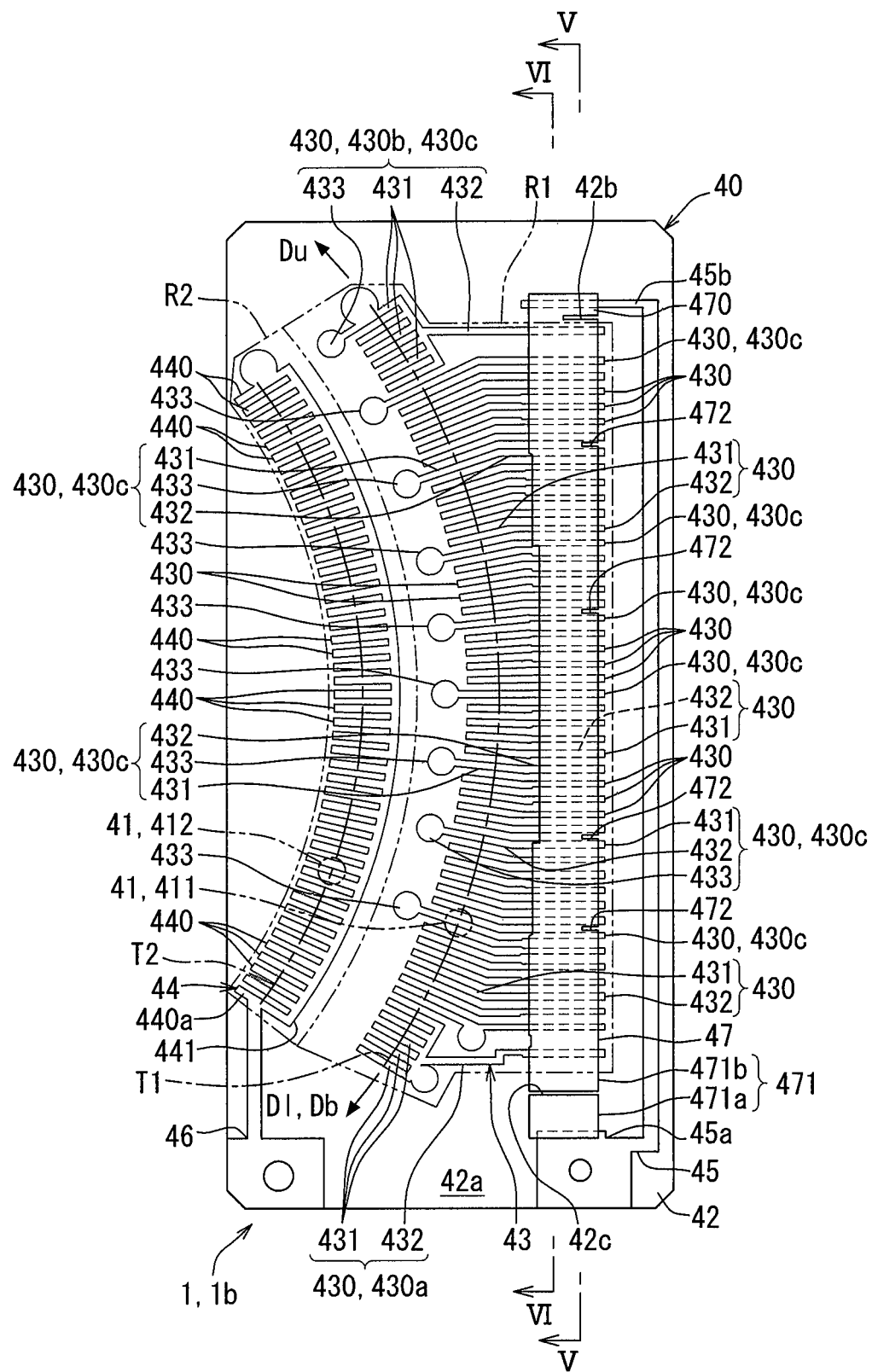
FIG. 4 is a front structural view showing a variable resistance unit in an inverting configuration according to the embodiment.

Sliding contacts 411 and 412 are provided at both the end portions of the movable electrode 41, respectively. As shown in FIGS. 3 and 4, trajectories T1 and T2 passing through the respective sliding contacts 411 and 412 by the reciprocating movement of the movable body 30 are formed in an arc shape along the movement directions Dl and Du within a limited angle range around the rotation center line C. In this example, the first trajectory T1 through which the first sliding contact 411 passes is provided in a radially outer side of the second trajectory T2 through which the second sliding contact 412 passes.

The circuit board 42 is made of, for example, an insulating ceramic material such as alumina. The circuit board 42 has a substantially rectangular plate-shape elongated in the vertical direction. The circuit board 42 is held by the body 10 in a state facing the rotor 31 and the movable electrode 41. The circuit board 42 has a flat mounting surface 42a on one side facing the rotor 31 and the movable electrode 41. The circuit board 42 is held by the body 10 in a state where the mounting surface 42a faces the movable electrode 41. As a result, the circuit board 42 is fixed in position to the fuel tank 2 shown in FIGS. 1 and 2 through the body 10 and the fuel pump module 3.

The fixed electrodes 43 and 44 and the output electrodes 45 and 46 shown in FIGS. 3 and 4 are made of a silver-based conductive metal material containing, for example, palladium or platinum. The fixed electrodes 43 and 44 and the output electrodes 45 and 46 are formed to have a substantially uniform thickness thinner than that of the circuit board 42 by printing a paste of such a conductive metal material on the mounting surface 42a and then performing a baking process. The fixed electrodes 43 and 44 and the output electrodes 45 and 46 are provided in the form of thin films having substantially the same thickness by printing on the mounting surface 42a.

The first fixed electrode 43 is separated into multiple segment electrodes 430 in a first electrode region R1 allocated to a part of the mounting surface 42a. Each segment electrode 430 integrally includes a sliding contact electrode portion 431 and a superimposing electrode portion 432. The sliding contact electrode portion 431 of each segment electrode 430 is formed to extend across from a radially inner side toward a radially outer side of the first trajectory T1. The sliding contact electrode portion 431 of each segment electrode 430 extends in a narrow linear band shape along a different radial direction of arbitrary radial directions of the first trajectory T1. The sliding contact electrode portions 431 of the respective segment electrodes 430 are aligned at a substantially constant pitch in the movement directions Dl and Du. As described above, in the first fixed electrode 43, the first sliding contact 411 can make sliding contact with the sliding contact electrode portion 431 of any one of the segment electrodes 430 on the first trajectory T1 in accordance with the movement of the movable body 30 within the limited angle range.

The superimposing electrode portion 432 of each segment electrode 430 is formed continuously from the corresponding sliding contact electrode portion 431 in a radially outer side of the first trajectory T1. However, in the segment electrodes 430 (430a and 430b to be described later in detail) respectively provided at both side movement ends of the movement directions Dl and Du, one superimposing electrode portion 432 common to the multiple sliding contact electrode portions 431 is continuously formed. The superimposing electrode portion 432 of each segment electrode 430 extends in a narrow linear band shape along a lateral direction substantially perpendicular to the vertical direction. The superimposing electrode portions 432 of the respective segment electrodes 430 are aligned at a variable pitch corresponding to the vertical direction forming portions.

Adjustment electrode portions 433 are added to two or more specific segment electrodes 430c which are separated by a set number in the alignment direction of the segment electrodes 430. The adjustment electrode portions 433 are formed on the mounting surface 42a by printing in a thin film shape having substantially the same thickness as the second fixed electrode 44 and the output electrodes 45 and 46. Each adjustment electrode portion 433 extends in a circular shape in the first electrode region R1 on the mounting surface 42a. Each adjustment electrode portion 433 is electrically connected to the sliding contact electrode portion 431, which is continuous from the sliding contact electrode portion 431 which configures the same specific segment electrode 430c as each other.

In each of those adjustment electrode portions 433, an electrical resistance through each of the specific segment electrodes 430c and the resistive element 47 between each adjustment electrode portion 433 and the first output electrode 45 is adjusted in advance, as will be described later in detail. In this example, in each of the specific segment electrodes 430c, it is assumed that the electrical resistance is substantially the same as a design value between the first sliding contact 411 in sliding contact with the sliding contact electrode portion 431 and the adjustment electrode portion 433. This relies on the fact that the electrical resistance of the specific segment electrode 430c is sufficiently low as compared to the electrical resistance of the resistive element 47 so that an error attributable to a manufacturing tolerance can be ignored. As described above, with the previous adjustment of the electrical resistance between each adjustment electrode portion 433 and the first output electrode 45, the electrical resistance through each specific segment electrode 430c and the resistive element 47 can be accurately adjusted between the first sliding contact 411 and the first output electrode 45.

The second fixed electrode 44 integrally includes multiple segment electrode portions 440 and a connection electrode portion 441 in a second electrode region R2 allocated to a part of the mounting surface 42a outside the first electrode region R1. Each of the segment electrode portions 440 is formed so as to extend across from a radially outer side to a radially inner side of the second trajectory T2. Each of the segment electrode portions 440 extends in a narrow linear band shape along a different radial direction from each other in arbitrary radial directions of the second trajectory T2. The respective segment electrode portions 440 are aligned at a substantially constant pitch in the movement directions Dl and Du. In this example, a pitch of the adjacent segment electrode portions 440 is set to a value larger than the pitch of the sliding contact electrode portions 431 described above. As described above, in the second fixed electrode 44, the second sliding contact 412 can make sliding contact with any of the segment electrode portions 440 on the second trajectory T2 in accordance with the movement of the movable body 30 within the limited angle range.

The connection electrode portion 441 is formed continuously from all the segment electrode portions 440 in a radially outer side of the second trajectory T2 and in a radially inner side of the first fixed electrode 43. The connection electrode portion 441 extends in a narrow arc band shape along the movement directions Dl and Du. The connection electrode portion 441 extends across between the end portions of the segment electrode portions 440 in the radially outer side, and is electrically connected to the segment electrode portions 440.

The first output electrode 45 is formed in an area on the mounting surface 42a extending across from an upper portion to a lower portion through a side portion from the first fixed electrode 43 of the first electrode region R1. The first output electrode 45 is electrically connected to the first fixed electrode 43 through the resistive element 47, which will be described later in detail. The second output electrode 46 is formed at a portion of the mounting surface 42a, which is deviated from the second fixed electrode 44 in the second electrode region R2 in the vertical direction. The second output electrode 46 is electrically connected to the segment electrode portion 440a by continuing from the segment electrode portion 440a located at the end portion of the second fixed electrode 44 in the vertical direction.

As described above, in the variable resistance unit 40, an electric output from the first and second output electrodes 45 and 46 is provided in accordance with an electrical resistance between the first output electrode 45 and the first sliding contact 411 and an electrical resistance between the first sliding contact 411 and the second output electrode 46 through the second sliding contact 412. In this example, in particular, since the electrical resistance between the first output electrode 45 and the first sliding contact 411 becomes an electrical resistance from the segment electrode 430 coming in sliding contact with the contact 411 through the resistive element 47, which will be described later in detail, the electrical resistance changes greatly with the movement of the movable body 30. As a result, the electric outputs from the first and second output electrodes 45 and 46 accurately represent the liquid surface level L shown in FIGS. 1 and 2 at a high resolution.

The resistive element 47 shown in FIGS. 3 and 4 is made of a high resistance metal material such as ruthenium oxide. The resistive element 47 is formed to have a substantially uniform thickness thinner than that of the circuit board 42 by printing a paste of such a high-resistance metal material on the mounting surface 42a and then baking the paste. With such printing on the mounting surface 42 a, the resistive element 47 is provided in the same thin film shape as that of the fixed electrodes 43, 44 and the output electrodes 45, 46, and is given a higher electrical resistance than that of the electrodes 43 to 46.

The resistive element 47 is provided so as to partially superimpose the first fixed electrode 43 and the first output electrode 45 on the mounting surface 42a so as to cover the first fixed electrode 43 in the first electrode region R1 and the first output electrode 45. The resistive element 47 extends in a wide arc band shape along the vertical direction in a radially outer side than the first trajectory T1, thereby spreading in the movement directions Dl and Du. The resistive element 47 extends across between the superimposing electrode portions 432 of the segment electrodes 430 of the first fixed electrode 43, and is electrically connected to the segment electrodes 430. Further, the resistive element 47 has one resistive portion 470 and one resistive portion 471 on both sides sandwiching the first electrode region R1 in which the segment electrodes 430 are aligned on the mounting surface 42a in the movement directions Dl and Du, respectively.

Figure 5:
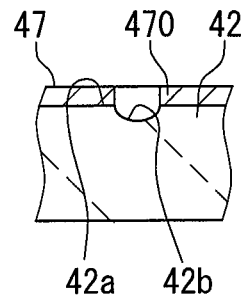
FIG. 5 is a cross-sectional view taken along a line V-V of FIGS. 3 and 4.

Specifically, the first resistive portion 470 is electrically connected to the respective electrodes 45 and 43 between the first output electrode 45 and the first fixed electrode 43 in the first electrode region R1. However, the first resistive portion 470 is partially cut over a part of the band width direction, to thereby adjust an electrical resistance between the first output electrode 45 side and the first electrode region R1 side (that is, the first fixed electrode 43 side) in accordance with a partial cutting amount in the band width direction. The partial cutting is realized by laser trimming, which will be described later in detail, so that the circuit board 42 is recessed from the mounting surface 42a as shown in FIG. 5. As a result, the circuit board 42 has a cut mark 42b recessed from the mounting surface 42a as shown in FIG. 3 to 55 at a partially cut portion between the electrodes 45 and 43 in the first resistive portion 470.

Incidentally, in necessary portions 472 shown in FIGS. 3 and 4 between the adjacent segment electrodes 430, the resistive element 47 is partially cut along a part of the band width direction in accordance with the first resistive portion 470, thereby forming a cut mark (not shown) in the circuit board 42. As a result, the electrical resistance of each segment electrode 430 between the first output electrode 45 and the first sliding contact 411 is adjusted in accordance with the partial cutting amount in the band width direction at the necessary portion 472.

Figure 6:
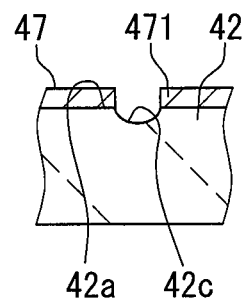
FIG. 6 is a cross-sectional view taken along a line VI-VI of FIGS. 3 and 4.

The second resistive portion 471 is positioned in the reference direction Db below the first resistive portion 470 (that is, the movement direction Dl). The second resistive portion 471 is electrically connected to the electrodes 45 and 43 between the first output electrode 45 and the first fixed electrode 43 in the first electrode region R1. However, the second resistive portion 471 is completely cut off over the entire region in the band width direction, thereby blocking the conduction between the first output electrode 45 side and the first electrode region R1 side. In other words, the second resistive portion 471 is completely cut off into an output electrode side divided portion 471a electrically connected to the lower first output electrode 45 and an electrode area side divided portion 471b electrically connected to the first fixed electrode 43 of the upper first electrode region R1. In this example, the complete cutting is realized by laser trimming, which will be described later in detail, so that the circuit board 42 is recessed from the mounting surface 42a as shown in FIG. 6. As a result, the circuit board 42 has a cut mark 42c recessed from the mounting surface 42a as shown in FIGS. 3, 4, and 6 at a completely cut portion between the electrodes 45 and 43 in the second resistive portion 471.

Next, a difference between the non-inverting configuration 1a and the inverting configuration 1b will be described. As shown in FIGS. 1 and 2, in the non-inverting configuration 1b, a bending shape of the arm 32 is different from that in the inverting configuration 1a. As a result, even if the orientations of the body 10 and the variable resistance unit 40 are inverted vertically from the non-inverting configuration 1a, the inverting configuration 1b can perform the reciprocating movement of the movable body 30 following the vertical movement of the liquid surface level L.

Further, in the non-inverting configuration 1a shown in FIG. 3, the movement direction Dl as the reference direction Db is set in the counterclockwise direction of FIG. 1 in which the movable body 3 is moved downward as the liquid surface level L is decreased. On the other hand, in the inverting configuration 1b shown in FIG. 4, the movement direction Dl as the reference direction Db is set in a clockwise direction of FIG. 2 in which the movable body 3 is moved downward as the liquid surface level L is decreased.

Further, the first resistive portion 470 of the non-inverting configuration 1a shown in FIG. 3 extends between a reference side electrode portion 45a located above the first fixed electrode 43 in the first output electrode 45 and a reference side segment electrode 430a located at an upper end portion of the first fixed electrode 43. On the other hand, the first resistive portion 470 of the inverting configuration 1b shown in FIG. 4 extends between an inversion side electrode portion 45b located above the reference side electrode portion 45a and the first fixed electrode 43 in the first output electrode 45 and the inversion side segment electrode 430b located at an upper end portion above the reference side segment electrode 430a in the first fixed electrode 43.

Further, the second resistive portion 471 of the non-inverting configuration 1a shown in FIG. 3 is divided vertically between the inversion side electrode portion 45b located lower than the first fixed electrode 43 in the first output electrode 45 and the inversion side segment electrode 430b located at the lower end portion in the first fixed electrode 43. On the other hand, the second resistive portion 471 of the inverting configuration 1b shown in FIG. 4 is divided vertically between the reference side electrode portion 45a located below the inversion side electrode portion 45b and the first fixed electrode 43 in the first output electrode 45 and the reference side segment electrode 430a located at a lower end portion below the inversion side segment electrode 430b in the first fixed electrode 43.

As described above, in the non-inverting configuration 1a in FIGS. 1 and 3 and the inverting configuration 1b in FIGS. 2 and 4, the alignment direction of the segment electrodes 430 from the reference side segment electrode 430a toward the inversion side segment electrode 430b is inverted vertically with respect to the fuel tank 2.

Next, a manufacturing method for manufacturing the liquid surface detecting device 1 will be described.

Figure 7:
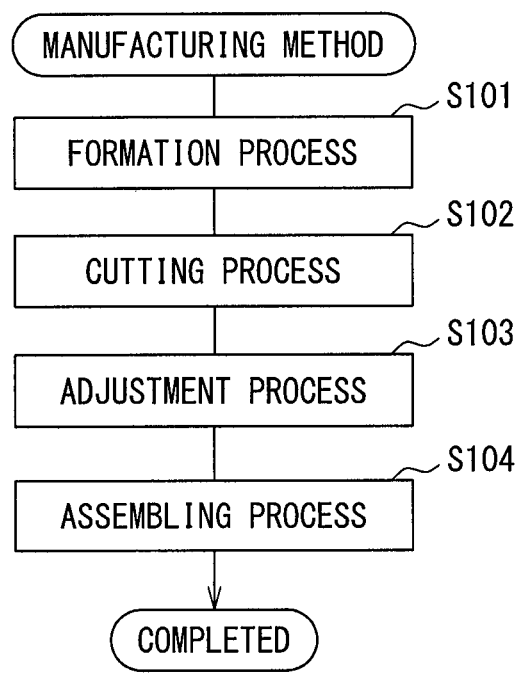
FIG. 7 is a flowchart showing a method of manufacturing a liquid surface detecting device according to the embodiment.
Figure 8:
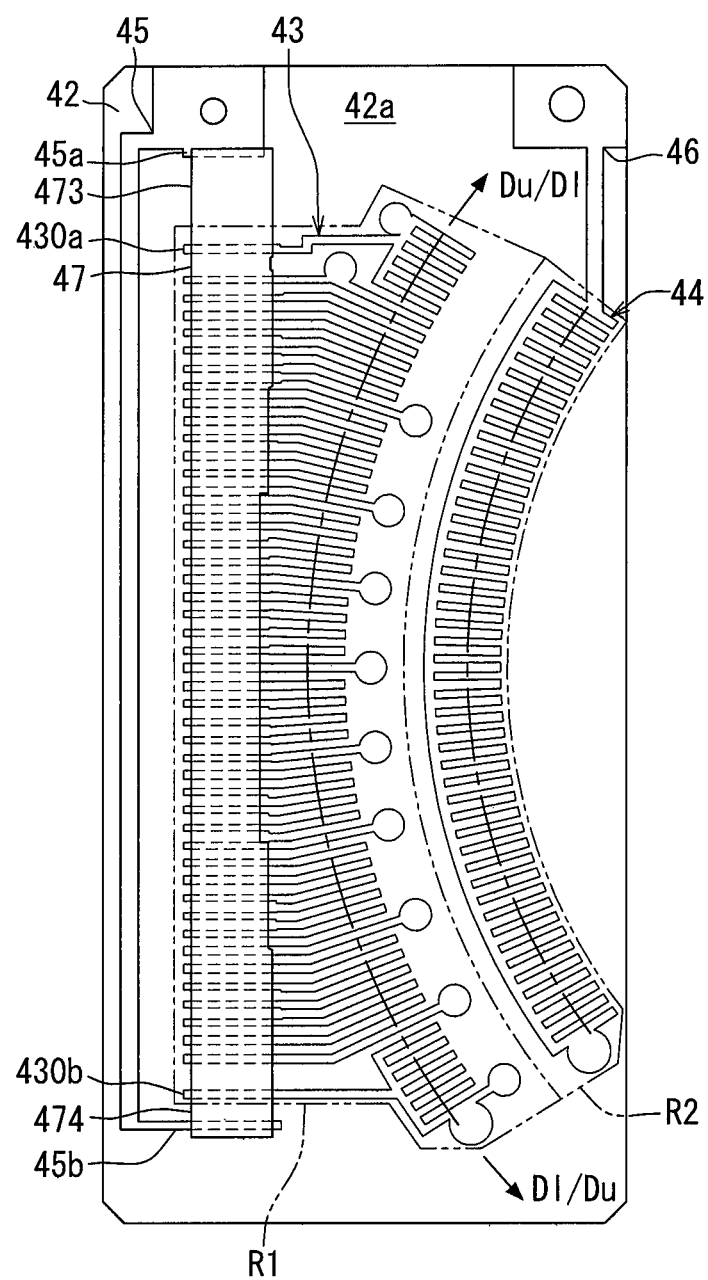
FIG. 8 is a front schematic view illustrating the method of manufacturing the liquid surface detecting device according to the embodiment.

In S101 of the manufacturing method shown in FIG. 7, a formation process is performed. In this S101, the fixed electrodes 43 and 44 are printed with the output electrodes 45 and 46 on the mounting surface 42a of the circuit board 42, as shown in FIG. 8, and the resistive element 47 is printed on the printed electrodes.

Specifically, the print formation in S101 means that the paste of the conductive metal material is printed on the mounting surface 42a and then the printed paste is braked as described above. In addition, the resistive element 47 is formed in S101 in a state where the resistive portion 473 before cutting, which is one of the first resistive portion 470 and the second resistive portion 471, and the resistive portion 474 before cutting, which is the other, are provided on both sides sandwiching the first electrode region R1 in the movement directions Dl and Du, respectively. In this example, the resistive portion 473 before cutting is formed between the reference side electrode portion 45a and the reference side segment electrode 430a. On the other hand, the resistive portion 474 before cutting is formed between the inversion side electrode portion 45b and the inversion side segment electrode 430b.

Incidentally, in S101 before cutting, since configuration commonality is realized between the non-inverting configuration 1a and the inverting configuration 1b, the movement directions Dl and Du cannot be determined. Therefore, in FIG. 8, "/" meaning "or" is used to designate symbol Dl/Du in one movement direction and Du/Dl in the other movement direction.

Figure 9:
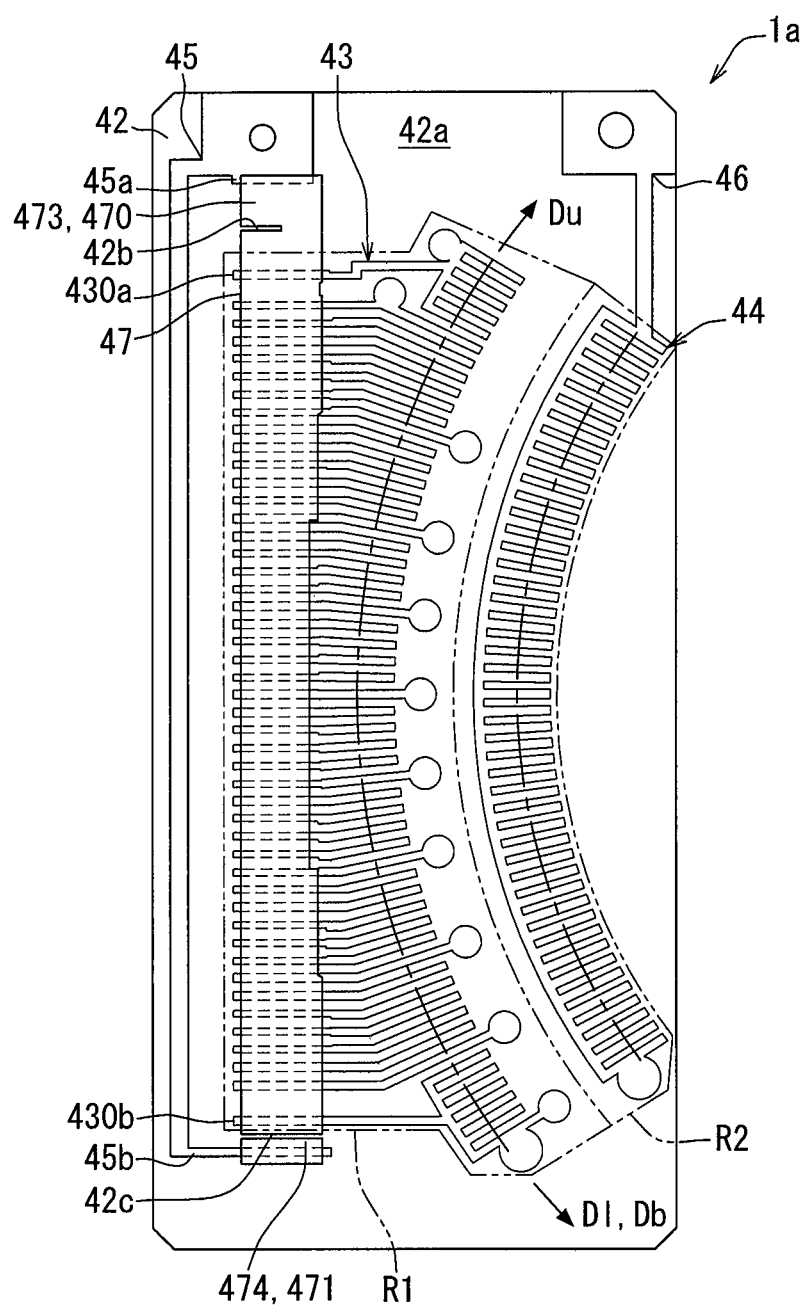
FIG. 9 is a front schematic view illustrating the method of manufacturing the liquid surface detecting device according to the embodiment.
Figure 10:
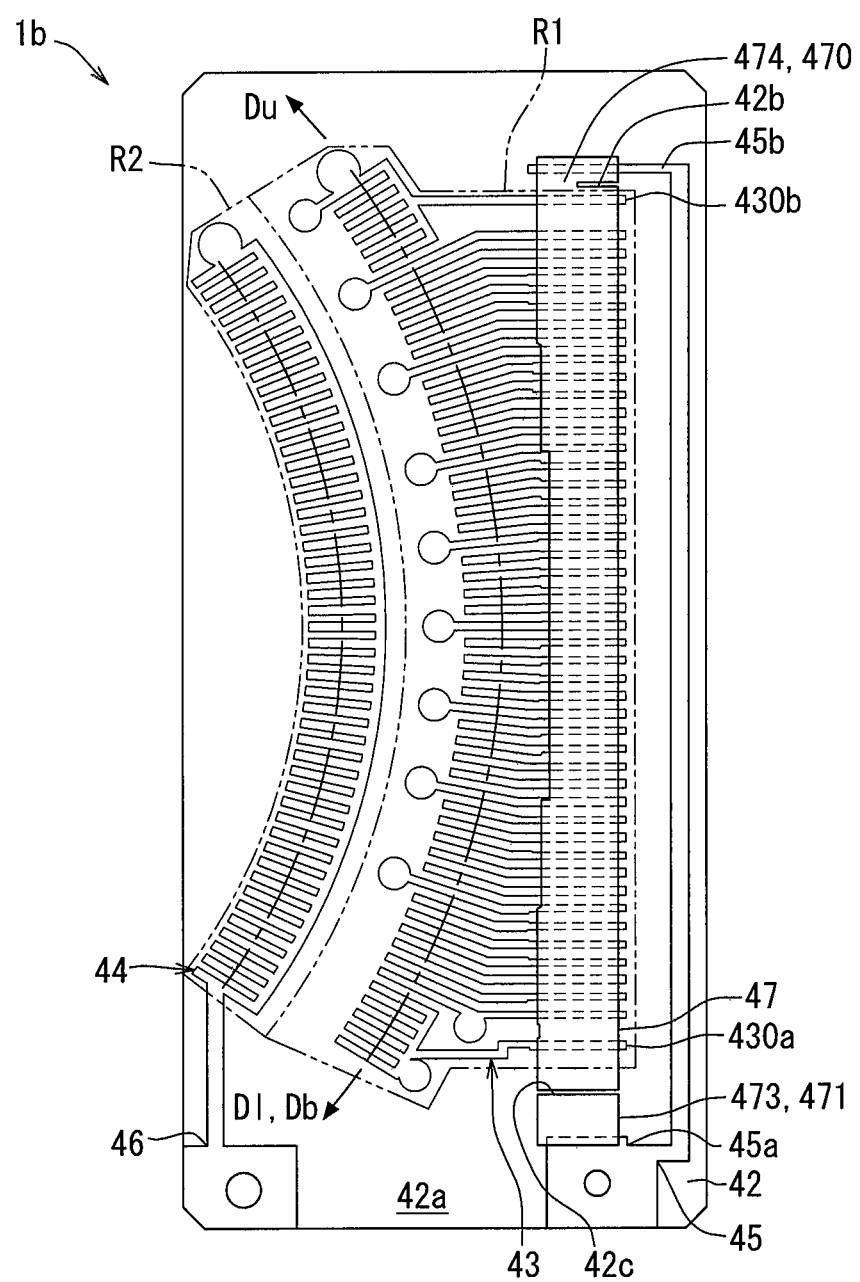
FIG. 10 is a front schematic view illustrating the method of manufacturing the liquid surface detecting device according to the embodiment.

Next, in S102 of the manufacturing method shown in FIG. 7, a cutting process is performed. In S102, as shown in FIGS. 9 and 10, either the partial cutting process or the complete cutting process is performed on the resistive portions 473 and 474 before cutting.

More specifically, in S102, a partial cutting process is performed on one of the resistive portions 473 and 474 which is selectively formed as the first resistor 470. In this example, in the case of selectively forming the first resistive portion 470 of the non-inverting configuration 1a, the resistive portion 473 between the reference side electrode portion 45a and the reference side segment electrode 430a is partially cut off over a part of the band width direction as shown in FIG. 9. On the other hand, when the first resistive portion 470 of the inverting configuration 1b is selectively formed, the resistive portion 474 between the inversion side electrode portion 45b and the inversion side segment electrode 430b is partially cut off over a part of the band width direction as shown in FIG. 10. In either of those configurations 1a and 1 b, the electrical resistance between the first output electrode 45 side and the first electrode region R1 side is adjusted by the first resistive portion 470 in accordance with the partial cutting amount in the band width direction. The electrical resistance adjustment by the partial cutting process in S102 can be realized in accordance with the electrical resistance adjustment in S103, which will be described later in detail. Therefore, it is needless to say that the partial cutting process in S102 may be performed as the partial cutting process that also serves as the cutting process in S103.

Along with the partial cutting process described above, in S102, a complete cutting process is performed on one of the resistive portions 473 and 474 which are selectively formed as the second resistive portion 471. In this example, when the second resistive portion 471 of the non-inverting configuration 1a is selectively formed, the resistive portion 474 between the inversion side electrode portion 45b and the inversion side segment electrode 430b is completely cut off over the entire region in the band width direction as shown in FIG. 9. On the other hand, when the first resistive portion 470 of the inverting configuration 1b is selectively formed, the resistive portion 473 between the reference side electrode portion 45a and the reference side segment electrode 430a is completely cut off over the entire region in the band width direction as shown in FIG. 10.

Figure 11:
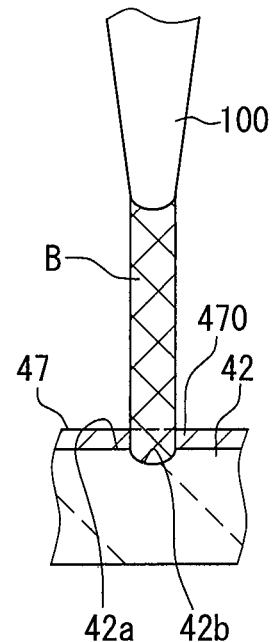
FIG. 11 is a schematic cross-sectional view illustrating the method of manufacturing the liquid surface detecting device according to the embodiment.
Figure 12:
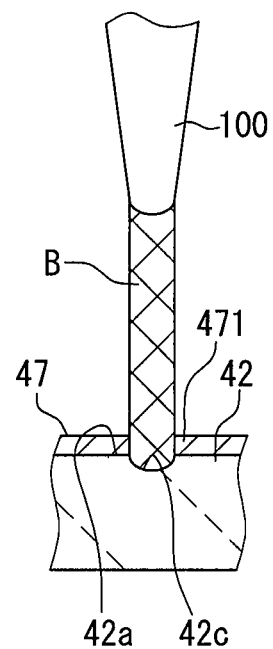
FIG. 12 is a schematic cross-sectional view illustrating the method of manufacturing the liquid surface detecting device according to the embodiment.

As shown in FIGS. 11 and 12, the partial cutting process and the complete cutting process in S102 as described above are realized by so-called laser trimming in which a laser beam B is irradiated from a laser processing device 100 to remove a resistive element material corresponding to a beam width. As a result, in the resistive element 47, the circuit board material is partially removed by the irradiation of the laser beam B at the partially cut portion of the first resistive portion 470 shown in FIGS. 9 to 11 and the complete cut portion of the second resistive portion 471 shown in FIGS. 9, 10, and 12, so that concave cut marks 42*b* and 42*c* are provided in the circuit board 42, which are recessed from the mounting surface 42*a*. This is because the circuit board material is inevitably partially removed by causing the laser beam B to reach the mounting surface 42*a* in order to remove all of the resistive element material on the mounting surface 42*a* in the thickness direction.

As a result of the cutting in S102 described above, the movement direction Dl as the reference direction Db is determined in the counterclockwise direction of FIG. 9 in the non-inverting configuration 1*a*, and the movement direction Dl as the reference direction Db is determined in the clockwise direction of FIG. 10 in the inverting configuration 1*b*.

Figure 13:
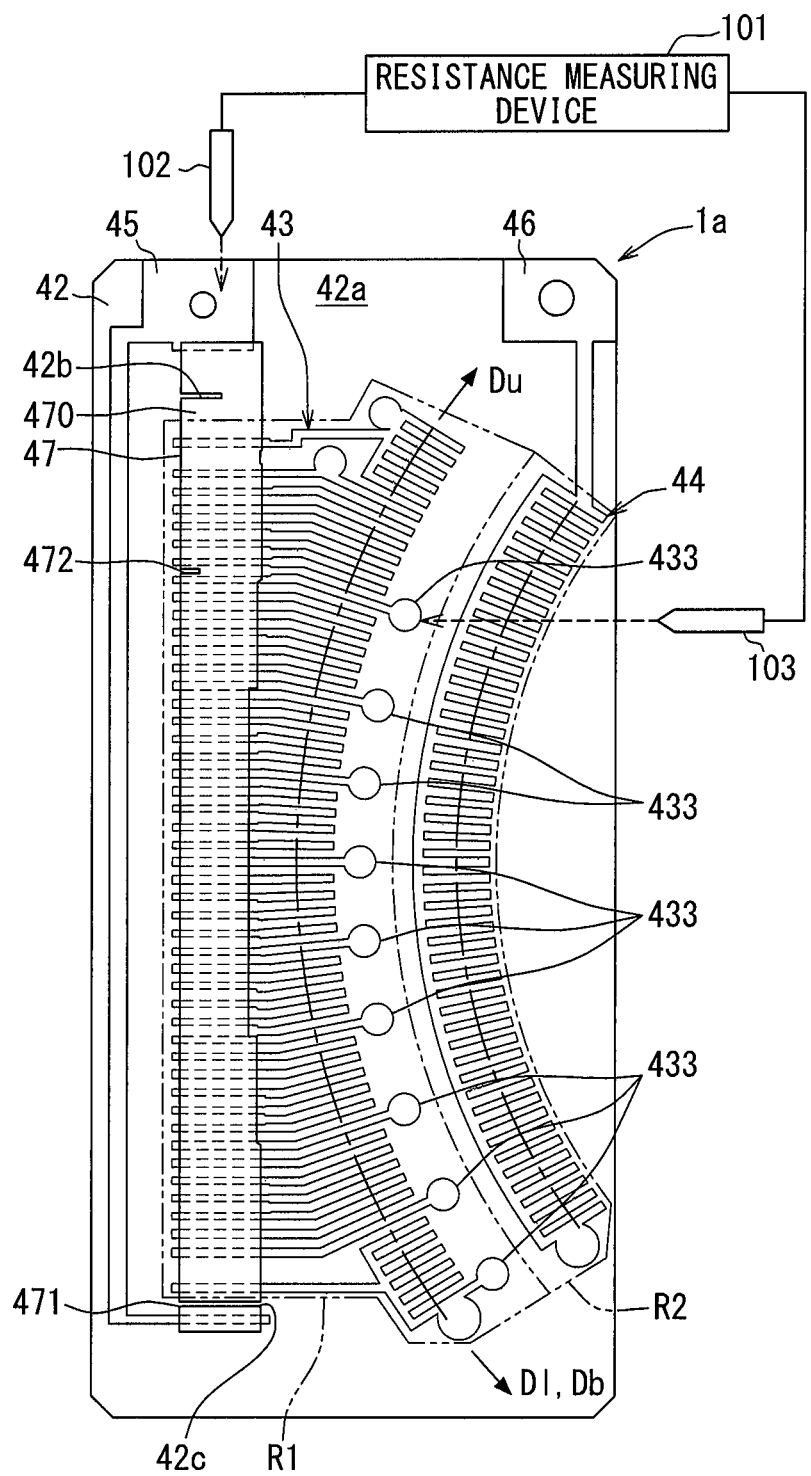
FIG. 13 is a front schematic view illustrating the method of manufacturing the liquid surface detecting device according to the embodiment.
Figure 14:
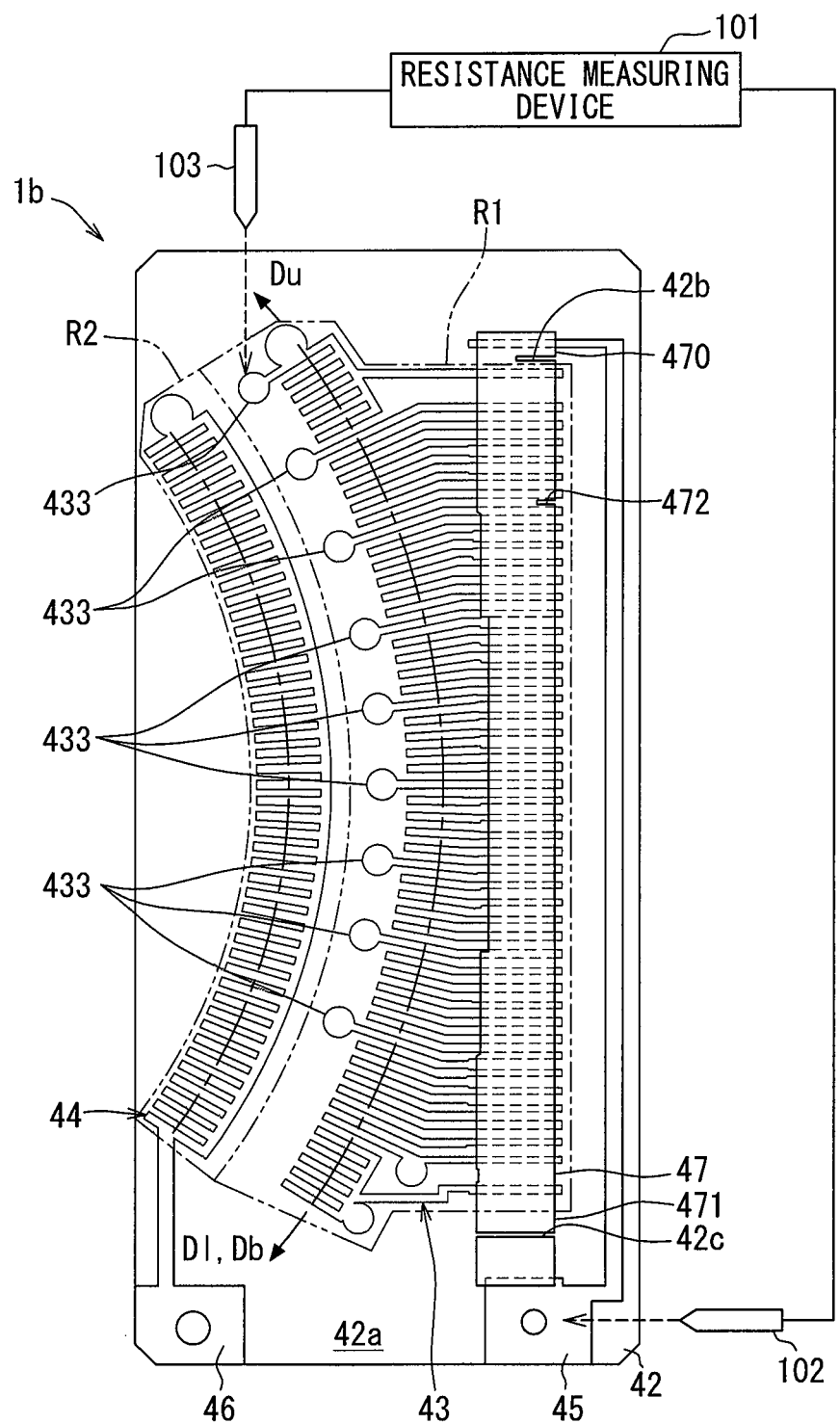
FIG. 14 is a front schematic view illustrating the method of manufacturing the liquid surface detecting device according to the embodiment.

In S103 of the manufacturing method shown in FIG. 7, an adjustment process is performed. In S 103, as shown in FIGS. 13 and 14, the electrical resistance is adjusted between the adjustment electrode portion 433 of the specific segment electrode 430*c* and the first output electrode 45.

Specifically, in S103, measurement probes 102 and 103 of the resistance measurement device 101 are pressed against the first output electrode 45 and the adjustment electrode portion 433, respectively. Further, in S103, the electrical resistance measured by the resistance measurement device 101 between the measurement probes 102 and 103, that is, between the adjustment electrode portion 433 and the first output electrode 45 is adjusted. In this example, in the adjustment of S103, when the measured value of the electrical resistance is deviated from a design value by an allowable error range or more, the necessary portion 472 of the resistive element 47 is partially cut at a portion in the band width direction, so that the electrical resistance between the adjustment electrode portion 433 and the first output electrode 45 is changed in accordance with the design value. At this time, the resistive element 47 is partially cut by the laser trimming in accordance with S 102, so that a cut mark recessed from the mounting surface 42 *a* is formed on the circuit board 42, although not illustrated in the partially cut portion. As described above, the partial cutting process on the first resistive portion 470 may be performed in S103 instead of S102, and FIG. 14 may be considered to represent an example of the partial cutting process in S103. As described above, the electrical resistance between the entire adjustment electrode portion 433 and the first output electrode 45 is adjusted by executing S103 described above between the entire adjustment electrode portion 433 and the first output electrode 45.

In the manufacturing method shown in FIG. 7, when S103 is completed in this manner, an assembling step is executed in S104. In S104, the circuit board 42 whose electrical resistance is adjusted as described above is mounted on the body 10, and the movable electrode 41 and the float 20 are mounted on the movable body 30, and then the movable body 30 is supported on the body 10. As a result, the variable resistance unit 40 and the liquid surface detecting device 1 including the variable resistance unit 40 are assembled together, and the manufacturing of the liquid surface detecting device 1 is completed.

The operation and effects of the liquid surface detecting device 1 and the manufacturing method of the detection device 1 described above will be described below.

According to the liquid surface detecting device 1, on both sides sandwiching the first electrode region R1 in which the segment electrodes 430 are aligned in the movement directions Dl and Du of the movable body 30 on the mounting surface 42*a* of the circuit board 42, the first resistive portion 470 and the second resistive portion 471 are electrically connected to the first output electrode 45. In this example, in the resistive element 47, the second resistive portion 471 positioned in the reference direction Db from the first resistive portion 470 is completely cut off so as to block the conduction between the first output electrode 45 side and the first electrode region R1 side. As a result, the alignment direction of the segment electrodes 430 in which the electrical resistance between the first sliding contact 411 and the first output electrode 45 gradually increases coincides with the reference direction Db in which the movable body 30 moves in accordance with the decrease in the liquid surface level L. Therefore, even if the electrical resistance of each segment electrode 430 between the first sliding contact 411 and the first output electrode 45 increases with time due to a deterioration of the resistive element material and the electrode material, when the liquid surface level L decreases, the liquid surface level L at a lower level than the actual level is detected in accordance with the electrical resistance increased with time. In other words, since the liquid surface level L can be detected on the safe side, the fuel shortage in the fuel tank 2 can be prevented.

In addition, according to the liquid surface detecting device 1, with a change in one of the two resistive portions 473 and 474 before cutting with the first electrode region R1 sandwiched between the resistive portions 473 and 474 in the resistive element 47, which is completely cut off as the second resistive portion 471, the alignment direction of the segment electrodes 430 with respect to the fuel tank 2 can be reversed. Therefore, if the resistive portion to be completely cut off is changed, the configuration before the complete cut (for example, refer to FIG. 8) can be made common in the non-inverting configuration 1*a* and the inverting configuration 1*b* without increasing the number of complete cut portions, so that high productivity can be achieved.

Further, according to the liquid surface detecting device 1, in the reference direction Db, the electrical resistance between the first sliding contact 411 and the first output electrode 45 gradually increases as the movable body 30 moves downward from the first resistive portion 470 to the second resistive portion 471 side as the liquid surface level L decreases. According to the above configuration, even if the electrical resistance of each segment electrode 430 increases with time due to material deterioration, when the movable body 30 moves downward in accordance with the decrease in the liquid surface level L, the liquid surface level L at a low level, which is a safe side is detected, thereby being capable of preventing the fuel shortage. In addition, since the first electrode region R1 in which the segment electrodes 430 are aligned between the upper first resistive portion 470 and the lower second resistive portion 471 is easily secured in the upper and lower directions in the fuel tank 2, the number of alignments of the segment electrodes 430 can be increased as much as possible to improve the detection resolution of the liquid surface level L.

Further, according to the liquid surface detecting device 1, the cut mark 42*c* recessed from the mounting surface 42*a* of the circuit board 42 is confirmed at the completely cut portion of the second resistive portion 471. In this example, after the formation the resistive element 47 having the resistive 473 and 474 on both sides before cutting, a complete cutting process is performed on one of the resistive portions 473 and 474 as the second resistive portion 471, thereby being capable of providing the cut mark 42c. From the above viewpoint, both of the non-inverting configuration 1a and the inverting configuration 1b can be easily manufactured by the complete cutting process for the resistive portion 473 or 474, thereby being capable of contributing to realization of high productivity.

In addition, according to the liquid surface detecting device 1, in the resistive element 47 in which the second resistive portion 471 is completely cut off, the first resistive portion 470 is partially cut off. Therefore, the alignment direction of the segment electrodes 430 can be reversed by exchanging one of the two resistive portions 473 and 474 before cutting, which is completely cut as the second resistive portion 471 and the other of the two resistive portions 473 and 474 which is partially cut as the first resistive portion 470. At the same time, in the first resistive portion 470, the electrical resistance between the first output electrode 45 side and the first electrode region R1 side can be adjusted in accordance with the partial cutting amount. From the above viewpoints, the degree of freedom of adjustment of the electrical resistance can be enhanced while increasing the productivity by making the configurations before complete cutting and before partial cutting common to both the non-inverting configuration 1a and the inverting configuration 1b.

In addition, according to the liquid surface detecting device 1, the cut mark 42b recessed from the mounting surface 42a of the circuit board 42 is confirmed at the partially cut portion of the first resistive portion 470. In this example, after the formation of the resistive element 47 having the resistive portions 473 and 474 on both sides before cutting, a partial cutting process is performed on the other of the resistive portions 473 and 474 as the first resistive portion 470, thereby being capable of providing the cut mark 42b. From the above viewpoints, the electrical resistance of both the non-inverting configuration 1a and the inverting configuration 1b can be easily adjusted by the partial cutting process for the resistive portion 474 or 473, thereby being capable of contributing to realization of high productivity.

Now, according to the method of manufacturing the liquid surface detecting device 1, the resistive element 47 having the resistive portions 473 and 474 on both sides sandwiching the first electrode region R1 in the movement directions Dl and Du of the movable body 30 on the mounting surface 42a of the circuit board 42 is formed by the formation process before the cutting process. Therefore, in the cutting process, one of the resistive portions 473 and 474 before cutting, which is the second resistor 471 positioned in the reference direction Db from the first resistor 470, is completely cut off. According to the above configuration, the alignment direction of the segment electrodes 430 with respect to the fuel tank 2 can be reversed by changing the resistive portion which is completely cut off as the second resistive portion 471. Therefore, if the resistive portion to be completely cut off is changed, the configuration before the complete cut (for example, refer to FIG. 8) can be made common in the non-inverting configuration 1a and the inverting configuration 1b without increasing the number of complete cut portions, so that high productivity can be achieved.

Further, according to the manufacturing method of the liquid surface detecting device 1, not only the second resistive portion 471 is completely cut off in the resistive element 47, but also the first resistive portion 470 is partially cut off. Therefore, if the amount of cutting the both-side resistive portions 473 and 474 before cutting is changed, the resistive portion completely cut off as the second resistive portion 471 and the resistive portion partially cut off as the first resistive portion 470 are interchanged with each other, thereby being capable of reversing the alignment direction of the segment electrodes 430. At the same time, in the first resistive portion 470, the electrical resistance between the first output electrode 45 side and the first electrode region R1 side can be adjusted in accordance with the partial cutting amount. From the above viewpoints, the degree of freedom of adjustment of the electrical resistance can be enhanced while increasing the productivity by making the configurations before complete cutting and before partial cutting common to both the non-inverting configuration 1a and the inverting configuration 1b.

Although an embodiment has been described above, the present disclosure is not construed as being limited to the embodiment, and can be applied to various embodiments within a scope that does not depart from the spirit of the present disclosure. A modification of the above embodiment will be described.

Specifically, in Modification 1, with the horizontal placement of the circuit board 42, the second resistive portion 471 may be positioned on one of the right and left sides of the first resistive portion 470 in the non-inverting configuration 1a, and the second resistive portion 471 may be positioned on the other of the right and left sides of the first resistive portion 470 in the inverting configuration 1b. In Modification 2, in S102, the first resistive portion 470 may not be subjected to the partial cutting process, and one of the resistive portions 473 and 474 before cutting may be left as it is as the first resistive portion 470.

In Modification 3, the partial cutting process and the complete cutting process in S102 may be realized by a method other than laser trimming, for example, etching processing or the like. In Modification 3, the cut marks 42b and 42c may not be provided on the circuit board 42.

In Modification 4, the second fixed electrode 44 formed of only the connection electrode portion 441 having a wide band shape may be adopted. In Modification 5, the adjustment electrode portion 433 may not be provided. In Modification 6, the liquid surface detecting device 1 may be applied to a device for detecting the liquid surface level L of a liquid other than the fuel in the container.

A liquid surface detecting device in the above-illustrated first aspect is for detecting a liquid surface level L of fuel in a fuel tank 2. The liquid surface detecting device 1, 1a, 1b includes a movable body 30 that includes a sliding contact 411 and is configured to reciprocates in accordance with the liquid surface level L, a circuit board 42 that includes a mounting surface 42a and is fixed in position to the fuel tank 2, a plurality of segment electrodes 430 that are provided on the mounting surface 42a to be arranged in a movement direction Dl, Du of the movable body 30, the sliding contact 411 being configured to come in sliding contact with the plurality of segment electrodes 430 in accordance with a movement of the movable body 30, an output electrode 45 that is provided on the mounting surface 42a and configured to give an electric output in accordance with an electrical resistance between the output electrode 45 and the sliding contact 411, and a resistive element 47 that is provided on the mounting surface 42a and has a higher electrical resistance than those of the plurality of segment electrodes 430. The resistive element 47 is located across the plurality of segment electrodes 430 and the output electrode 45 to be electrically connected to the plurality of segment electrodes 430 and the output electrode 45. The plurality of segment electrodes 430 are arranged on the mounting surface 42a in an electrode region R1. The resistive element 47 includes a first resistive portion 470 and a second resistive portion 471 on both sides of the electrode region R1 in the movement direction Dl, Du. The resistive element 47 is electrically connected to the output electrode 45 at each of the first resistive portion 470 and the second resistive portion 471. The movement direction Dl in which the movable body 30 moves in accordance with a decrease of the liquid surface level L is defined as a reference direction Db. The second resistive portion 471 located further in the reference direction Db than the first resistive portion 470 is completely cut off to block a conduction between its output electrode side 471a and electrode region side 471b.

As described above, according to the first aspect, the first resistive portion and the second resistive portion are electrically connected to the output electrode on both sides sandwiching the electrode region in which the segment electrodes are aligned in the movement direction of the movable body on the mounting surface of the circuit board. In this example, in the resistive element, the second resistive portion positioned in the reference direction from the first resistive portion is completely cut off so as to cut off the conduction between the output electrode side and the electrode region side. As a result, the alignment direction of the segment electrodes in which the electrical resistance between the sliding contact and the output electrode gradually increases coincides with the reference direction in which the movable body moves in accordance with the decrease in the liquid surface level. Therefore, even if the electrical resistance of each segment electrode between the sliding contact and the output electrode increases with time due to the deterioration of the resistive element material and the electrode material, when the liquid surface level decreases, the liquid surface level at a lower level than the actual level is detected in accordance with the increased electrical resistance with time. In other words, since the liquid surface level can be detected on the safe side, the fuel shortage in the fuel tank can be restricted.

In addition, according to the first aspect, in the resistive element, the alignment direction of the segment electrodes relative to the fuel tank can be reversed by changing one of the both-side resistive portions before cutting with the electrode region interposed between those resistive portions as the second resistive portion. Therefore, if the resistive portion to be completely cut is changed, the configuration before the complete cut can be made common between the non-inverting configuration and the inverting configuration, without increasing the number of complete cut portions, so that high productivity can be achieved.

In the above illustrated second aspect, a method of manufacturing the liquid surface detecting device in the first aspect includes a formation process S101, in which the resistive element 47 having resistive portions 473, 474 respectively on both sides of the electrode region R1 in the movement direction Dl, Du is formed on the mounting surface 42a, and a cutting process S102, in which one of the resistive portions 473, 474 serving as the second resistive portion 471 located further in the reference direction Db than the first resistive portion 470 is completely cut off.

As described above, according to the second aspect, the resistive element having the resistive portions on both sides sandwiching the electrode region in the movement direction of the movable body on the mounting surface of the circuit board is formed by the formation process before the cutting process. Therefore, in the cutting process, one of the resistive portions before cutting, which is the second resistive portion positioned in the reference direction from the first resistive portion, is completely cut off. According to the above configuration, the alignment direction of the segment electrodes relative to the fuel tank can be reversed by changing the resistive portion which is completely cut as the second resistive portion. Therefore, if the resistive portion to be completely cut is changed, the configuration before the complete cut can be made common between the non-inverting configuration and the inverting configuration, without increasing the number of complete cut portions, so that high productivity can be achieved.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A liquid surface detecting device for detecting a liquid surface level of fuel in a fuel tank, the liquid surface detecting device comprising:
   a movable body that includes a sliding contact and is configured to reciprocate in accordance with the liquid surface level;
   a circuit board that includes a mounting surface and is fixed in position to the fuel tank;
   a plurality of segment electrodes that are provided on the mounting surface to be arranged in a movement direction of the movable body, wherein the sliding contact is configured to come in sliding contact with the plurality of segment electrodes in accordance with a movement of the movable body;
   an output electrode that is provided on the mounting surface and configured to give an electric output in accordance with an electrical resistance between the output electrode and the sliding contact; and
   a resistive element that is provided on the mounting surface and has a higher electrical resistance than the plurality of segment electrodes, wherein:
   the resistive element is located across the plurality of segment electrodes and the output electrode to be electrically connected to the plurality of segment electrodes and the output electrode;
   the plurality of segment electrodes are arranged on the mounting surface in an electrode region;
   the resistive element includes a first resistive portion and a second resistive portion on both sides of the electrode region in the movement direction;
   the resistive element is electrically connected to the output electrode at each of the first resistive portion and the second resistive portion;
   the movement direction in which the movable body moves in accordance with a decrease of the liquid surface level is defined as a reference direction; and
   the second resistive portion located further in the reference direction than the first resistive portion is completely cut off to block a conduction between its output electrode side and electrode region side.

2. The liquid surface detecting device according to claim 1, wherein:
the movable body is configured to be movable in the reference direction toward a lower side as the liquid surface level decreases; and
the second resistive portion is located on the lower side of the first resistive portion.

3. The liquid surface detecting device according to claim 1, wherein the circuit board includes a cut mark that is recessed from the mounting surface at a complete cut portion of the second resistive portion.

4. The liquid surface detecting device according to claim 1, wherein the first resistive portion is partially cut off to adjust an electrical resistance between the output electrode side and the electrode region side.

5. The liquid surface detecting device according to claim 4, wherein the circuit board includes a cut mark that is recessed from the mounting surface at a partial cut portion of the first resistive portion.

6. A method of manufacturing the liquid surface detecting device according to claim 1, comprising:

performing a formation process, in which the resistive element having resistive portions respectively on both sides of the electrode region in the movement direction is formed on the mounting surface; and performing a cutting process, in which one of the resistive portions serving as the second resistive portion located further in the reference direction than the first resistive portion is completely cut off.

7. The method of manufacturing the liquid surface detecting device according to claim 6, wherein in the cutting process, the other one of the resistive portions serving as the first resistive portion is partially cut off to adjust an electrical resistance between the output electrode side and the electrode region side.

* * * * *